United States Patent [19]

Wienpahl

[11] 4,142,646

[45] Mar. 6, 1979

[54] DEVICE FOR THE METALLIC SEALING OF AN INTERMEDIATE PARTITION ON A VESSEL

[75] Inventor: Wolfgang Wienpahl, Bochum, Fed. Rep. of Germany

[73] Assignee: Balcke-Dürr Aktiengesellschaft, Ratingen, Fed. Rep. of Germany

[21] Appl. No.: 871,129

[22] Filed: Jan. 23, 1978

[30] Foreign Application Priority Data

Feb. 24, 1977 [DE] Fed. Rep. of Germany ....... 2707916

[51] Int. Cl.² .......................... B65D 1/24; B65D 1/36
[52] U.S. Cl. .................................... 220/22; 220/319; 292/256.63; 292/299
[58] Field of Search ................. 220/22, 319, 320, 321; 292/299, 256.63, 256.65, 256.6

[56] References Cited

U.S. PATENT DOCUMENTS

| 2,344,986 | 3/1944 | Hothersall | 220/22 |
| 2,725,252 | 11/1955 | Greer | 220/319 X |
| 3,238,574 | 3/1966 | Martin et al. | 220/319 |

FOREIGN PATENT DOCUMENTS

| 1955464 | 5/1971 | Fed. Rep. of Germany | 220/22 |
| 671146 | 8/1929 | France | 292/256.65 |

*Primary Examiner*—William Price
*Assistant Examiner*—Joseph M. Moy
*Attorney, Agent, or Firm*—Martin A. Farber

[57] ABSTRACT

A device for the metallic sealing of an intermediate partition on the smooth inner wall of a cylindrical vessel, particularly with large diameters, by means of a sealing ring which is variable with respect to its diameter, on which sealing ring, the intermediate partition is fastened. The sealing ring is divided into at least two parts, and is able to be expanded at the separation positions, respectively, by one wedge each.

10 Claims, 4 Drawing Figures

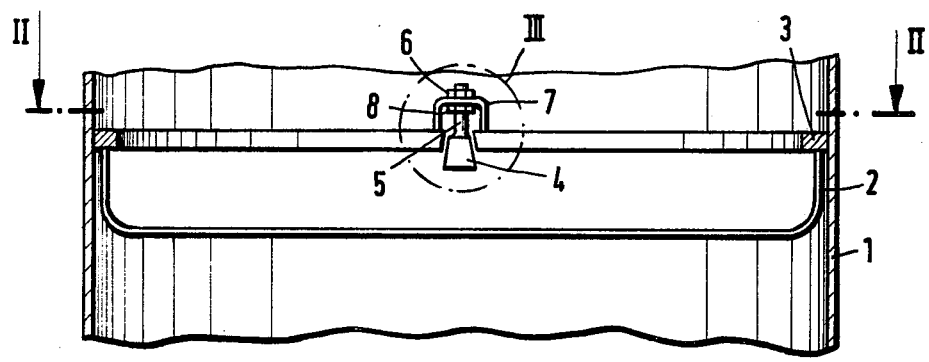
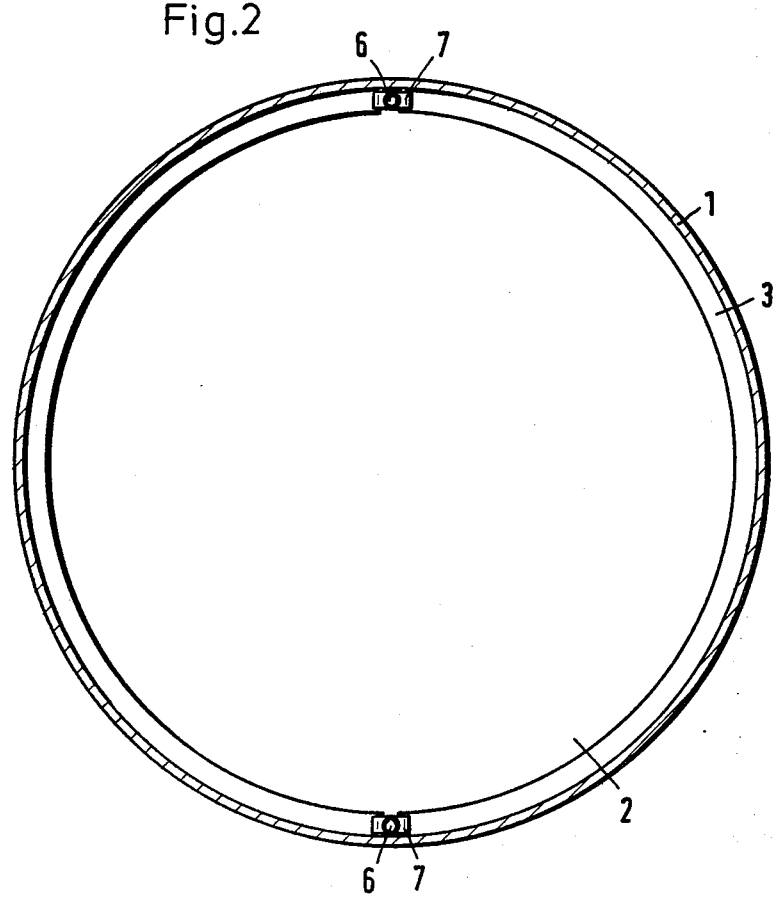

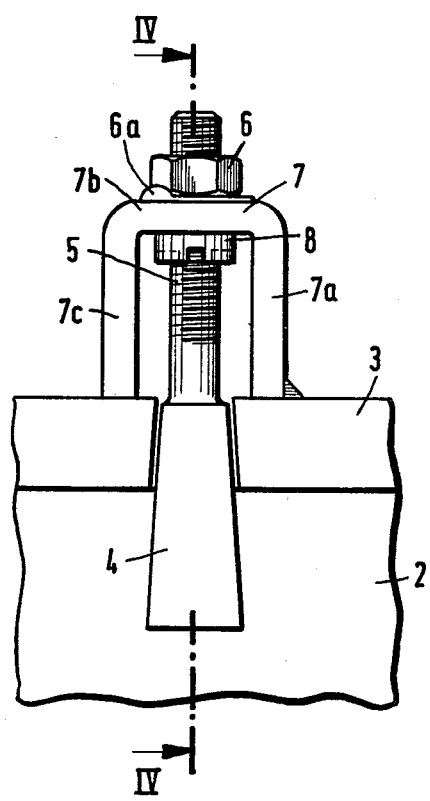
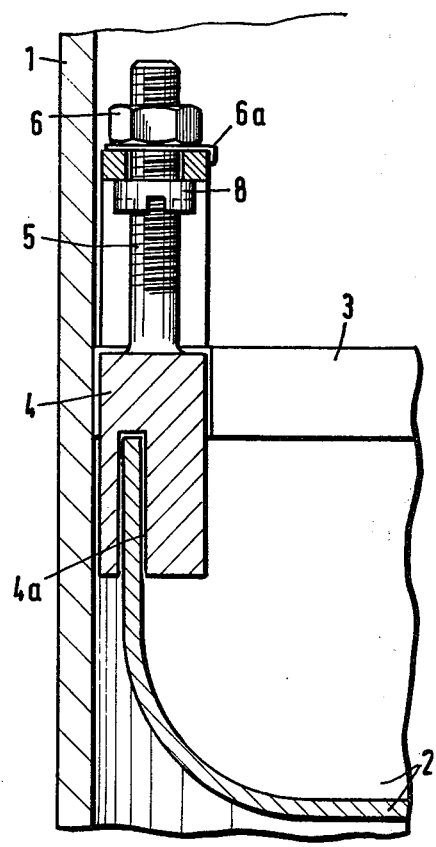

DEVICE FOR THE METALLIC SEALING OF AN INTERMEDIATE PARTITION ON A VESSEL

The invention relates to a device for the metallic sealing of an intermediate bottom or partition on the smooth inner wall of a cylindrical vessel, particularly with large diameters, by means of a sealing ring which is variable with respect to its diameter, on which sealing ring, the intermediate partition is fastened.

For sealing of intermediate partitions on an inner wall of cylindrical vessels it is known to screw flange rings welded on the vessel wall on the bottoms with the intermediate assembly or insertion of elastic seals. With devices used in nuclear energy systems the prohibition exists of arranging the intermediate partition to be removable; elastic seals are not desired since they are difficultly decontaminable.

Consequently a device for sealing an intermediate partition on the smooth inner wall of a cylindrical vessel is known in which the intermediate partition is sealed by a sealing ring. This ring is slit once and with respect to its diameter is produced larger than the inner diameter of the cylindrical vessel. By use of the slit sealing ring with the intermediate partition, in this manner the sealing ring by its internal or inherent stress abuts against the wall of the vessel, so that a metallic sealing is achieved. However, particularly with vessels with larger diameters this sealing ring provides a gap between the vessel wall and the sealing ring, through which impermissible high leakage currents can penetrate.

It is an object of the present invention to provide an apparatus for the metallic sealing of an intermediate partition on the smooth inner wall of a cylindrical vessel, which guarantees a reliable seat or mounting for the intermediate partition and consequently effects a good metallic sealing-off of the vessel in the region of the intermediate partition.

It is another object of the present invention to aid the solution of the above-mentioned object in the manner that the sealing ring is divided into at least two parts, and is able to be expanded at the separation positions, respectively, by one wedge each.

With this proposal of the invention, a device is provided which with maintaining of a good decontaminability provides a good metallic sealing of the intermediate partition, since the clamping force which is exerted on the sealing ring is applied directly at the cross-section - center of gravity of the sealing ring cross-section, so that a raising of the sealing ring by moments is prevented. The device in accordance with the present invention has a simple construction and facilitates a quick assembling and disassembling of the intermediate partition. Finally it is not limited to the use of a specified or certain material.

According to a further feature of the invention, each wedge is provided with one setting or regulating screw 5 which is moveable in the longitudinal direction of the vessel 1 by means of an adjustable nut 6, which nut is supported on the sealing ring 3. In this manner a sensitive and secure bracing of the divided sealing ring is achieved on the smooth inner wall of the vessel.

The adjustment nut 6 in accordance with the present invention can be supported on a U-shaped yoke 7 spaced apart from the sealing ring 3, which yoke with its stay 7b engages over the separation position of the sealing ring. In this manner not only is a reliable support of the wedge achieved, but also the possibility is provided for arranging the wedge, without it being able to be lost, on one part each of the sealing ring, in the manner that according to a further feature of the invention the yoke is fastened only with one leg on the sealing ring and the other leg is merely supported thereon. This formation connects the wedge via the yoke reliably with one part of the sealing ring, and with the one-side fastening of the sealing ring guarantees, however, that no deformations occur in the legs of the yoke with an adjustment of the wedge.

With one preferred embodiment of the invention, the yoke is arranged on the upper side of the sealing ring. Furthermore it is advantageous to arrange a counter nut on the setting screw, preferably underneath the yoke, in order to prevent a loosening of the wedge, which for example can take place with a momentary distension or swelling of the vessel wall with a compression test.

According to a further feature of the invention, each wedge is provided with a slit for passage of the intermediate partition therethrough. The intermediate partition in accordance with the invention can be formed as a bubble (cap) plate or bell base.

With the above and other objects and advantages in view, the present invention will become more clearly understood in connection with the following detailed description of a preferred embodiment, when considered with the accompanying drawings, of which:

FIG. 1 is a longitudinal section through one part of the vessel in the range of the intermediate partition;

FIG. 2 is a cross-section through the vessel taken along the section lines II—II of FIG. 1;

FIG. 3 is a side elevational view of the wedge connection according to the circled portion of FIG. 1 in enlarged scale; and FIG. 4 is a section taken along the section lines IV—IV of FIG. 3.

Referring now to the drawings, a vessel 1 constitutes a cylindrical vessel of a large diameter as is used for example for columns, which operate in the vacuum range and at one absolute atmosphere, respectively. The vessel 1 has a smooth inner wall, opposite or with respect to which an intermediate bottom or partition 2, which is formed in the manner of a bell-shaped bottom, is sealed by means of a sealing ring 3. The intermediate partition 2, for example, is welded, clamped or fastened with screws onto the sealing ring 3, of course with the necessary sealing effect or action. The sealing must however not be air-tight by all means, since also in the range of the wedge connection III an air-tight sealing cannot always be attained. The intermediate partition or bottom 2, for example, is pressed flushly on the sealing ring 3 by means of clamping clips or yokes. The connection between the intermediate partition 2 and the sealing ring 3 also can take place by means of welds, bolts or screws.

In the illustrated embodiment the sealing ring 3 is divided in two parts so that two separation places are provided. At each of these separation places the sealing ring 3 is able to be expanded respectively by means of a wedge 4, so that the sealing ring 3 can be pressed against the wall of the vessel 1 to achieve a metallic sealing. In order to make possible a passage or penetration of the intermediate wall 2 through the wedge 4, each wedge 4 is formed with a slot 4a, as best seen in FIG. 4. Of course instead of two separation positions also a plurality of separating places can be provided, which particularly with vessels with larger diameters produce a uniform or constant application of the pressing force against the wall of the vessel. The type of fastening between the intermediate partition 2 and the sealing ring 3 is not limited in the present invention, nor is the number of wedge connections III (reference numerals 4–8), which particularly depends on the diameter of the sealing ring 3.

Each wedge 4 is provided with a setting screw 5 extending therefrom which is adjustable in the longitudinal direction of the vessel 1 by an adjustment nut 6. In the illustrated embodiment this adjustment nut 6 is supported on a U-shaped yoke 7, the latter being welded with one of its legs 7a onto one half of the sealing ring 3 on its upper side. This yoke 7 with its web or stay 7b engages over the separating position and is supported with its other leg 7c on the upper surface of the other half of the sealing ring 3, without being fastened to this half, permitting relative sliding during expansion of the sealing ring 3. In this manner a bending of the legs 7a and 7c of the yoke 7 is avoided with a tightening or pulling of the wedge 4.

For securing or fixing the prevailing position of the wedge 4, not only is a locking plate 6a provided for the adjustment nut 6, but additionally a counter nut 8 is provided, the latter being arranged under the web 7b of the yoke 7.

Particularly in the illustrations of FIGS. 3 and 4 which are drawn in enlarged scale it may be recognized that a raising or removal of the sealing ring 3 from the wall of the vessel 1 or a slipping or shifting of the sealing ring 3 are avoided in the manner that the clamping forces, which are exerted by means of the wedge 4 on the parts of the sealing ring 3, are applied directly at the center of gravity or inertia of the cross-section of the sealing ring. Consequently a good sealing is effected between the inner wall of the vessel 1 and the sealing ring 3. Since the wedge 4 seals and closes the separating positions of the sealing ring 3 and the intermediate partition 2 runs in the narrow slot 4a of each wedge 4, with the previously described device not only is a good metallic sealing achieved between the vessel 1 and the intermediate partition 2, but also the origination of undesired leakage currents is prevented through the separating places of the sealing ring 3.

While I have disclosed one embodiment of the present invention, it is to be understood that this embodiment is given by example only and not in a limiting sense.

I claim:

1. In a cylindrical vessel having an intermediate partition attached to the inner surface of a wall of said vessel, said intermediate partition including a sealing ring attached therein, the improvement comprising
said sealing ring in at least two parts being separated by a space,
wedge means, respectively, located at said space to expand the sealing ring towards said surface of said vessel.

2. The device as set forth in claim 1, wherein
each of said wedge means includes a setting screw means for setting each of said wedge means relative to adjacent of said parts of said sealing ring,
an adjustment nut means each for moving each of said setting screw means in a longitudinal direction of said vessel, each said adjustment nut means is operatively supported on said sealing ring.

3. The device as set forth in claim 2, further comprising
a U-shaped yoke for each of said wedge means, respectively,
said adjustment nut means is supported on said U-shaped yoke spaced from said sealing ring,
said U-shaped yoke includes a stay, the latter engages over the space, respectively, of said sealing ring, said setting screw means extends through said stay.

4. The device as set forth in claim 3, wherein
said U-shaped yoke includes two legs on each side of said stay integral therewith, only one of said legs is secured on one of said parts of said sealing ring, the other of said legs of said U-shaped yoke is merely supported on an adjacent other of said parts of said sealing ring.

5. The device as set forth in claim 3, wherein
said U-shaped yoke is disposed on an upper side of said sealing ring, and the intermediate partition is disposed on a lower side of said sealing ring.

6. The device as set forth in claim 4, further comprising
a counter nut is arranged on said setting screw means against one side of said stay, and said adjustment nut means is threaded on said setting screw means and supported on the opposite side of said stay.

7. The device as set forth in claim 6, wherein said counter nut is threaded on said setting screw means on a lower side of said yoke, said lower side of said yoke faces an upper side of said sealing ring.

8. The device as set forth in claim 1, wherein
each of said wedge means is formed with a slot, said slot is adapted for the intermediate partition to extend through said slot.

9. The device as set forth in claim 8, wherein
each of said wedge means is disposed between adjacent of said parts of said sealing ring sealing the space and is formed with wedge surfaces extending divergingly downwardly in a direction below said sealing ring.

10. The device as set forth in claim 1, further comprising
an intermediate partition is secured to said sealing ring and is formed as a bell-shaped bottom.

* * * * *